US007191161B1

(12) United States Patent
Rai et al.

(10) Patent No.: US 7,191,161 B1
(45) Date of Patent: Mar. 13, 2007

(54) METHOD FOR CONSTRUCTING COMPOSITE RESPONSE SURFACES BY COMBINING NEURAL NETWORKS WITH POLYNOMINAL INTERPOLATION OR ESTIMATION TECHNIQUES

(75) Inventors: Man Mohan Rai, Los Altos, CA (US); Nateri K. Madavan, Cupertino, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 463 days.

(21) Appl. No.: 10/637,087

(22) Filed: Jul. 31, 2003

(51) Int. Cl.
*G06E 1/00* (2006.01)
(52) U.S. Cl. .............................. 706/15; 706/21; 706/26
(58) Field of Classification Search .................. 706/15, 706/21, 26; 364/148
See application file for complete search history.

(56) References Cited

U.S. PATENT DOCUMENTS

| 5,781,430 | A | * | 7/1998 | Tsai ............................ 700/28 |
| 5,841,651 | A | * | 11/1998 | Fu ............................... 700/48 |
| 5,966,527 | A | * | 10/1999 | Krivokapic et al. .......... 703/14 |
| 6,304,836 | B1 | * | 10/2001 | Krivokapic et al. .......... 703/14 |
| 6,850,874 | B1 | * | 2/2005 | Higuerey et al. ............... 703/4 |

OTHER PUBLICATIONS

Drela, M., "Elements of Airfoil Design Methodology," in *Applied Computational Aerodynamics Progress in Astronautics and Aeronautics*, vol. 125, pp. 167-189, 1990. P. A. Henne, Ed.

Volpe, G., "Inverse Airfoil Design: A Classical Approach Updated for Transonic Applications," in *Applied Computational Aerodynamics, Progress in Astronautics and Aeronautics*, vol. 125, pp. 191-220, 1990. P. A. Henne, Ed.

Jameson, A., "Optimum Aerodynamic Design Using CFD and Control Theory," AIAA Paper, No. 95-1729-CP, 1995.

Narducci, R., Grossman, B., and Haftka, R. T., "Sensitivity Algorithms for an Inverse Design Problem Involving a Shock Wave," Inverse Problems in Engineering, vol. 2, pp. 49-83, 1995.

Myers, R. H. and Montgomery, D. C., *Response Surface Methodology—Process and Product Optimization Using Designed Experiments*, John Wiley and Sons, New York, 1995.

(Continued)

*Primary Examiner*—Joseph P. Hirl
(74) *Attorney, Agent, or Firm*—John F. Schipper; Robert M. Padilla (57) ABSTRACT

A method and system for data modeling that incorporates the advantages of both traditional response surface methodology (RSM) and neural networks is disclosed. The invention partitions the parameters into a first set of s simple parameters, where observable data are expressible as low order polynomials, and c complex parameters that reflect more complicated variation of the observed data. Variation of the data with the simple parameters is modeled using polynomials; and variation of the data with the complex parameters at each vertex is analyzed using a neural network. Variations with the simple parameters and with the complex parameters are expressed using a first sequence of shape functions and a second sequence of neural network functions. The first and second sequences are multiplicatively combined to form a composite response surface, dependent upon the parameter values, that can be used to identify an accurate model.

9 Claims, 8 Drawing Sheets

OTHER PUBLICATIONS

Fan, X., Herbert, T., and Haritonidis, J. H., "Transition Control with Neural Networks," AIAA Paper No. 95-0674, AIAA 33rd Aerospace Sciences Meeting, Reno, Nevada, Jan. 9-12, 1995.

Kawthar-Ali, M. H., and Acharya, M., "Artificial Neural Networks for Suppression of the Dynamic Stall Vortex Over Pitching Airfoils," AIAA Paper No. 96-0540, AIAA Aerospace Sciences Meeting Reno, Nevada, Jan. 15-18, 1996.

Faller, W. E., and Schreck, S. J., "Unsteady Fluid Mechanics Applications of Neural Networks," AIAA Paper No. 95-0529, AIAA 33rd Aerospace Sciences Meeting, Reno, Nevada, Jan. 9-12, 1995.

Norgaard, M., Jorgensen, C. C., and Ross, J. C., "Neural Network Prediction of New Aircraft Design Coefficients," NASA TM 112197, May 1997.

Meade, A. J., "An Application of Artificial Neural Networks to Experimental Data Approximation," AIAA Paper No. 93-0408, AIAA 31st Aerospace Sciences Meeting, Reno, Nevada, Jan. 11-14, 1993.

Greenman, R., and Roth, K., High-Lift Optimization Design Using Neural Networks on a Multi-Element Airfoil, ASME Paper DETC98/CEE-6006, 18th ASMF, Computers in Engineering Conference, Atlanta, GA, Sep. 13-16, 1998.

Hajela, P., and Berke, L., "Neural Networks in Structural Analysis and Design: An Overview," AIAA Paper No. 92-4805-CP, 4th AIAA/USAF/NASA/OAI Symposium on Multidisciplinary Analysis and Optimization, Cleveland, Ohio, Sep. 21-23, 1992.

Huang, S. Y., Miller, L. S., and Steek, J. E., "An Exploratory Application of Neural Networks to Airfoil Design." AIAA Paper No. 94-501, AIAA 32nd Aerospace Sciences Meeting, Reno, Nevada, Jan. 10-13, 1994.

Sanz, J.M., "Development of a Neural Network Design System for Advanced Turbo-Engines," Fourth U.S. National Congress on Computational Mechanics, Aug. 7-8, 1997, San Francisco, California.

Rai, M. M., and Madavan, N. K., "Application of Artificial Neural Networks to the Design of Turbomachinery Airfoils," AIAA Paper No. 98-1003, AIAA 36th Aerospace Sciences Meeting Reno, Nevada, Jan. 1998.

Pierret, S., and Van den Braembussche, R. A., "Turbomachinery Blade Design Using a Navier-Stokes Solver and Artificial Neural Network," Journal of Turbomachinery, vol. 121, pp. 326-332, 1999.

Barron, A. R., "Approximation and Estimation Bounds for Artificial Neural Networks," *Machine Learning*, vol. 14, pp. 115-133, 1994.

Montgomery, D. C., *Design and Analysis of Experiments*, John Wiley and Sons, New York, 1997.

Dring, R. P., and Heiser, W. H., "Turbine Aerodynamics," in Aerothermodynamics of Aircraft Engine Components, Oates, G. C., Ed., pp. 219-271. AIAA, New York, 1985.

Dunn, M., Bennett, W., Delaney, R. A., and Rao, K. V., "Investigation of Unsteady Flow Through a Transonic Turbine Stage: Part 11-Data/Prediction Comparison for Time-Averaged and Phase-Resolved Pressure Data," AIAA Paper No. 90-2409, 26th AIAA/ASME/SAE/ASEE Joint Propulsion Conference and Exhibit, Orlando, FL, Jul. 16-18, 1990.

Rai, M. M., and Madavan, N. K., "Aerodynamic Design Using Neural Networks," AIAA Paper No. 98-4928, Seventh AIAA/USAF/NASA/ISSMO Symposium on Multidisciplinary Analysis and Optimization, St. Louis, MO, Sep. 2-4, 1998.

Madavan, N. K., and Rai, M. M., "Neural Net-Based Redesign of a Gas Generator Turbine for Improved Unsteady Aerodynamic Performance," AIAA Paper No. 99-2522, 35th AIAA/ASME/SAE/ASEE Joint Propulsion Conference and Exhibit, Los Angeles, CA, Jun. 20-24, 1999.

\* cited by examiner

A. Initial Airfoil Design

B. Midway through Euler Optimization Process

C. Start of Navier-Stokes Optimization Process

D. Final Optimized Design

Fig. 5A

Fig. 6B Optimized Design

Fig. 6A Reference Design

Fig. 7B Optimized Design

Fig. 7A Reference Design

METHOD FOR CONSTRUCTING COMPOSITE RESPONSE SURFACES BY COMBINING NEURAL NETWORKS WITH POLYNOMINAL INTERPOLATION OR ESTIMATION TECHNIQUES

CROSS REFERENCE TO RELATED APPLICATIONS

This application claims the benefit of U.S. Pat. No. 6,606,612, filed Aug. 13, 1999 and entitled "Method For Constructing Composite Response Surfaces By Combining Neural Networks With Other Interpolation Or Estimation Techniques," which is incorporated by reference herein.

ORIGIN OF THE INVENTION

The invention described herein was made by employees of the United States Government and may be manufactured and used by or for the Government for governmental purposes without the payment of any royalties thereon or therefor.

TECHNICAL FIELD

The present invention is a method for constructing composite response surfaces by combining neural networks with polynomial interpolation or estimation techniques. These composite response surfaces can be used in a variety of applications. In particular, such surfaces are very useful in aerodynamic design optimization which has several attributes that render it a difficult problem to solve.

DESCRIPTION OF THE RELATED ART

The design of aerodynamic components of aircraft, such as wings or engines, involves a process of obtaining the most optimal component shape that can deliver the desired level of component performance, subject to various constraints, e.g., total weight or cost, that the component must satisfy. Aerodynamic design can thus be formulated as an optimization problem that involves the minimization of an objective function over the design space, subject to constraints. A variety of formal optimization methods have been developed in the past and applied to aerodynamic design. These include inverse design methods, adjoint methods, sensitivity derivative-based methods, and traditional response surface methodology (RSM).

Aerodynamic design data has traditionally been obtained from a variety of sources. In the past, experiments and simple analyses have provided the majority of data used in design. More recently, the methods of Computational Fluid Dynamics (CFD) have been used to generate a significant portion of the design data. A hierarchy of approximations to the governing partial differential equations (i.e., the Navier-Stokes equations), ranging from the simple potential flow equations to the Euler and Reynolds-averaged, Navier-Stokes equations, have been used for this purpose.

Typically, the simpler and lower fidelity potential flow solutions have been used in the initial stages of design because they are relatively inexpensive to compute, and because a large number of solutions are required at this stage. Here the term "fidelity" is used to denote the extent to which the system of equations faithfully represents the physical characteristics of the flow. The higher fidelity Euler and Navier-Stokes solutions are generally used in the final stages of design because of the high cost of computing these solutions. It has been found that neural networks provide a natural framework within which a succession of solutions of increasing fidelity can be represented and subsequently utilized for optimization and design thus reducing overall design costs. The design data can come from a variety of sources, including experiments and computations. Rules-of-thumb that designers have evolved over a number of years can also be incorporated within the optimization routines as constraints. These facts are of considerable importance to the aircraft industry which has accumulated enormous amounts of experimental data and numerous design rules over a number of decades.

Response surface methodology (RSM) represents a framework for obtaining optimal designs using statistical methods such as regression analysis and design of experiments. Traditional RSM, as it has been used in practice, employs low-order regression polynomials to model the variation of the aerodynamic quantities, or some measure of optimality, with respect to the design variables. This polynomial model of the objective function in design space is then searched to obtain the optimal design. Several such polynomial models may have to be constructed to traverse the region of design space that lies between the initial design and the optimal design. However, modeling complex functional behaviors using traditional RSM will necessitate the use of high-order polynomials with their attendant problems. On the other hand, neural networks are well suited to modeling complex functions in multiple dimensions. Here, the possibility of utilizing these positive attributes of neural networks in the context of RSM methodology is explored.

Artificial neural networks have been widely used in various fields including aeronautical engineering. Recent aerodynamic applications include, for example, flow control, estimation of aerodynamic coefficients, compact functional representations of aerodynamic data for rapid interpolation, grid generation, and aerodynamic design. Neural networks have been used to both model unsteady flows and to optimize aerodynamic performance parameters. Significant cost savings have been realized in reducing wind tunnel test times by using neural nets to interpolate between measurements. Neural network applications in aeronautics are not limited to aerodynamics, and include structural analysis and design.

In order for neural networks to be used effectively in aerodynamic (or other) design problems, it is imperative that the design space be populated both adequately and efficiently with simulation or experimental data. A sparse population results in an inaccurate representation of the objective function in design space while an inefficient use of aerodynamic data in populating the design space could result in excessive simulation costs. Conventional neural networks are restricted to simple designs involving only a few design parameters because a linear increase in the number of design parameters often results in a geometric increase in the number of datasets required to adequately represent the design space.

Therefore, a need exists for adequately and efficiently populating large-dimensional design spaces to achieve an optimal design. More particularly, to be able to use existing design or experimental data, or partial or unstructured sets of data, to influence the design process.

SUMMARY OF THE INVENTION

These needs are met by the invention, which provides a method and system for constructing composite response surfaces that incorporates the advantages of both traditional response surface methodology (RSM) and neural networks. The invention employs a unique strategy called parameter-based partitioning of the design or modeling space. The term "design space" refers to a multi-dimensional region that encompasses all possible designs and is the region defined by the coordinates and associated coordinate ranges of the various design parameters and bounded by their individual upper and lower limits. In the method, composite response surfaces are constructed using parameter-based partitioning. These composite response surfaces are based on both neural networks and on other interpolation/estimation techniques. A sequence of such response surfaces is used to traverse the design space to identify an optimal solution, or to model a process or a response of physical object. The composite response surface thus has both the power of neural networks and the economy of other estimation techniques, such as low-degree polynomials (in terms of the number of simulations needed and the network training requirements). The invention handles design problems with many more parameters than would be possible using conventional neural networks alone, and the invention permits a designer to rapidly perform a variety of trade-off studies before arriving at a final solution. It also allows the use of less-expensive, low-fidelity simulations in the early stages of the design and a smooth transition to higher fidelity simulations as the search for the optimal design evolves thus significantly reducing the computational costs incurred in simulation-based design.

DESCRIPTION OF BEST MODES OF THE INVENTION

Figure 1:
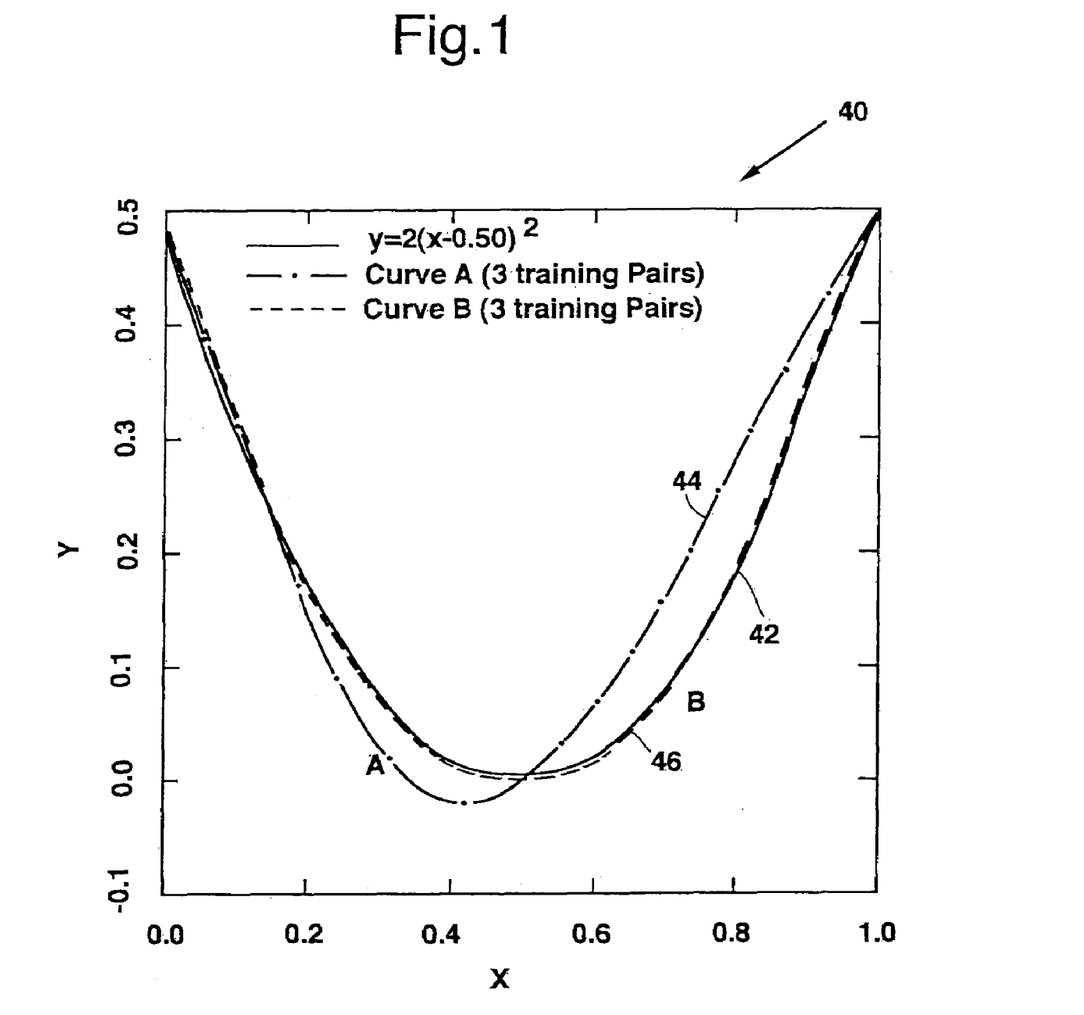
FIG. 1 is a graphical representation of a parabolic function and the neural network approximations of this function.

In accordance with the invention, composite response surfaces are constructed using a combination of neural networks and other interpolation and estimation techniques (low order polynomials, Fourier transforms, etc.). By way of example and not of limitation, the composite response surfaces described herein will be constructed using neural networks and polynomials (as the choice of interpolation/ estimation technique). It should be appreciated that the primary motivation for constructing a composite response surface based on neural networks and polynomials comes from a careful examination of the relative strengths of these two approaches in interpolating design data or in modeling. Neural networks provide a very general framework for estimation in multiple dimensions. FIG. 1 illustrates a graphical representation 40 of a parabola 42 given by $$y=2(x-0.5)^2, \qquad (1)$$

and the neural network approximations to this function. The network is shown trained with three training pairs 44 (Curve A) and also with five training pairs 46 (Curve B). The generalization ability obtained when only three training pairs are used is inadequate for most purposes. It should be noted that the training error in this first situation (Curve A) was decreased by 25 orders of magnitude. A marked improvement in generalization is seen with the use of five training pairs 46.

The graphs 40 of FIG. 1 demonstrate that neural-network based generalization can become unreliable when the amount of available training data is very small. However, the use of a single linear neuron with a preprocessor that provides the input nodes with the bias, and the coefficient values for x and also $x^2$ would yield a perfect fit with just three training pairs, in this situation. Note that such a single linear neuron is, in essence, a polynomial fit. An advantage of the polynomial fit provided by the single linear neuron is that the polynomial requires a prescribed minimum number of data points for a given number of polynomial terms, and, this number increases in a polynomial fashion with the number of dimensions. For example, if a quadratic fit was used to represent the data, the number of data points required to compute the coefficients of the polynomial would increase quadratically with the number of dimensions. If the target function can be locally approximated using low-order polynomials, there is an advantage to using polynomial fits instead of neural networks.

The present invention combines the strengths of neural networks and other interpolation/estimation techniques, by constructing composite response surfaces using parameter-based partitioning. In parameter-based partitioning, the functional dependence of the variables of interest with respect to some of the design parameters is represented using neural networks, and the functional dependence with respect to the remaining parameters is represented using other interpolation/estimation techniques, e.g., polynomial regression methods. This approach is an extension of traditional response surface methods that are based on polynomials alone. The use of neural networks in conjunction with other methods results in a composite response surface that models the functional behavior in design space or modeling space. When first- or second-order polynomials are used, the number of data sets required increases in a linear or quadratic manner, respectively, with the number of parameters.

From the example and discussion below, the present invention combines conventional polynomial approximations on L-dimensional simplexes with the flexibility that neural networks (or Fourier series, for periodic functions) provide. This provides a mathematical model whose complexity can be adjusted on a dimensional basis to suit the function being modeled, thus reducing the amount of data required. The term "L-dimensional simplex" refers to a spatial configuration of L dimensions determined by L+1 equispaced vertices, on a hyper-sphere of unit radius, in a space of dimension equal to L, where any L vertices are linearly independent. For example, a two-dimensional simplex is an equilateral triangle that is circumscribed by a unit circle, and a three-dimensional simplex is a regular tetrahedron, with vertices lying on a unit sphere.

The method for constructing composite response surfaces, using the parameter-based partitioning technique, is best described by an illustrative example in the context of a particular application. The application considered here is design optimization of an aerodynamic component because of its inherent complexities and attributes that render it a suitable candidate for this approach.

Although several methods can be used to represent the functional behavior of the design data, neural networks are particularly suitable for multidimensional interpolation where the data are not structured. Since most design problems in aerodynamics involve a multitude of parameters and datasets that often lack structure, neural networks provide a level of flexibility not attainable with other methods. In fact, partial datasets or even a single data point intermingled with more complete datasets can be used to influence a design or modeling process.

As noted in the preceding, in order for neural networks to be used effectively in design, it is imperative that the design or modeling space be populated both adequately and efficiently with simulation or experimental data. The invention disclosed here, namely the construction of composite response surfaces using parameter-based partitioning, directly addresses this problem. The number of datasets required to populate the design space is greatly reduced, thus allowing use of designs or models involving a larger number of parameters than would be possible using neural networks alone. Consider a simple design or model that involves three parameters. Typically, $3^3=27$ simulations would be required to populate this three-dimensional design space. Clearly, this process results in inordinately large number of simulations in high-dimensional design spaces. For example, the number of simulations that would be required for a 100-parameter design or modeling problem is $3^{100}$, or about $5 \times 10^{47}$. By contrast, for a linear representation within a simplex, the current approach would require between 100 and 200 simulations.

In addition to drastically reducing the computational requirements to obtain the simulation data, the method of the present invention also has a dramatic impact on the neural net training process. First, the reduction in the total amount of simulation data greatly reduces the training requirements. Second, the use of multiple estimation methods to represent the data also reduces training times. This is because a part of the complexity of representing the function is transferred from the neural network to the polynomial approximation.

In the context of design optimization, the further the optimal solution is from this initial design the larger the region of design space that must be represented by the composite response surface ("CRS"). An inordinately large amount of data would normally be required to adequately populate the design space. Here, a sequence of composite response surfaces is used, where each CRS represents a limited local region in the design space. This greatly reduces the number of simulations required in the current approach.

ILLUSTRATIVE EXAMPLES

The following applications have been chosen to demonstrate how the invention can be used to address various applications. Although these applications are chosen from aerodynamic design, the present invention is clearly not limited to this application area alone.

Composite Response Surfaces Construction for Aerodynamic Design Optimization

By way of example, but not of limitation, consider design of an aerodynamic component, where the data can be generated for prescribed values of the design parameters. Additionally, assume that variation of the aerodynamic data of interest with respect to a first group of the design parameters is not very complex; this may be because the parameter variations are small or because the underlying function is simple), and, hence, does not require the generality of a neural network-based estimation scheme. Therefore, simple polynomials can be used to represent the variation of the function with this first group of parameters, and a neural network can be used for the remaining parameters.

Figure 2:
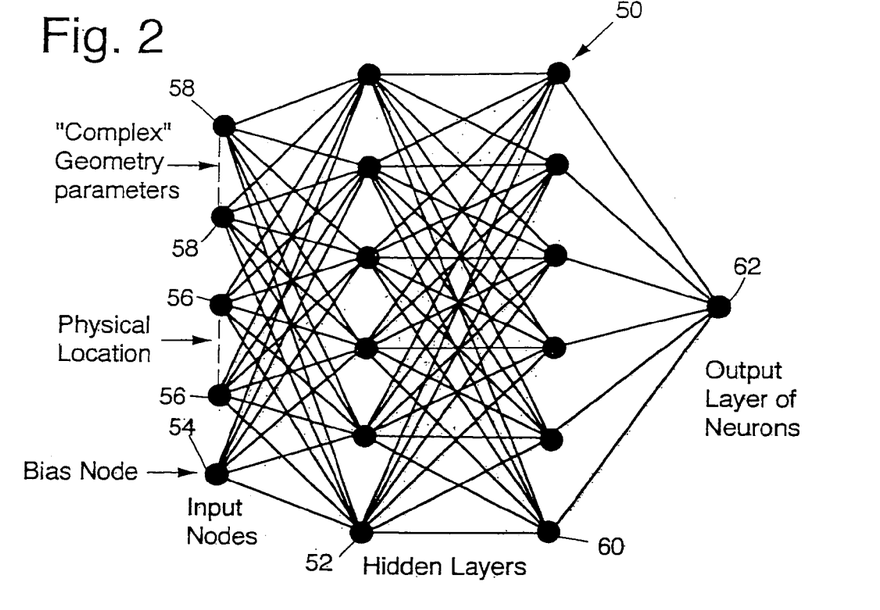
FIG. 2 shows a geometrical diagram of a three-layer neural network for use with the method of the present invention.

The manner in which the present invention can be used in a specific aerodynamic design problem is now described. Two-dimensional airfoil design where the goal of the optimization is to determine the airfoil shape that most closely matches a given airfoil surface pressure distribution is considered. FIG. 2 shows a three-layer neural network 50 (with two hidden layers, 52 and 60). The variation of aerodynamic data along a surface of the airfoil is typically far more complicated than the variation with small changes in geometric parameter values. Hence, the neural network 50 is used to represent aerodynamic data variation in physical space. The first node 54 in the input layer is a bias node (input value of 1.0). A second set of nodes specifies the physical location 56. In this particular two-dimensional design environment, the physical location 56 is specified by a single parameter, the axial location on the airfoil surface. Given h (=s+c) geometric parameters that determine the shape of the airfoil, assume that the variation of the first c parameters or variables results in "complex" variations in the aerodynamic data (in this case, pressure) and the variation of the remaining s parameters or variables results in fairly "simple" variations in the data that can be represented by low-order polynomials. For example, a simple parameter may be represented by one or more polynomials of order no greater than a small positive integer $M_s$ (e.g., $M_s=1$, 2 or 3) in that parameter. Optionally, complex parameters may be represented by a polynomial having an order at least equal to a positive integer $M_c$, where $M_c>M_s$, or by a sum of trigonometric or Fourier components. Alternatively, a complex parameter is any parameter that cannot be represented as a simple parameter.

The third set of input nodes 58 in FIG. 2 accepts the first c geometric parameters. Pressure values corresponding to axial locations and geometry parameters specified at the input nodes are obtained at the output node 62.

Figure 3A:
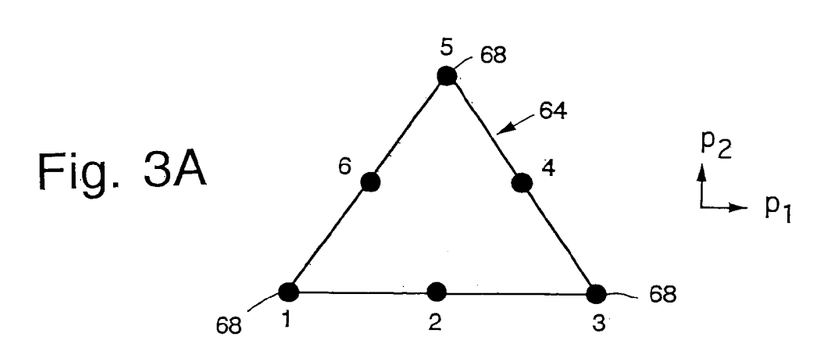
FIG. 3 shows geometrical shapes for two- and three-dimensional simplexes also for use with the method of the present invention.
Figure 3B:
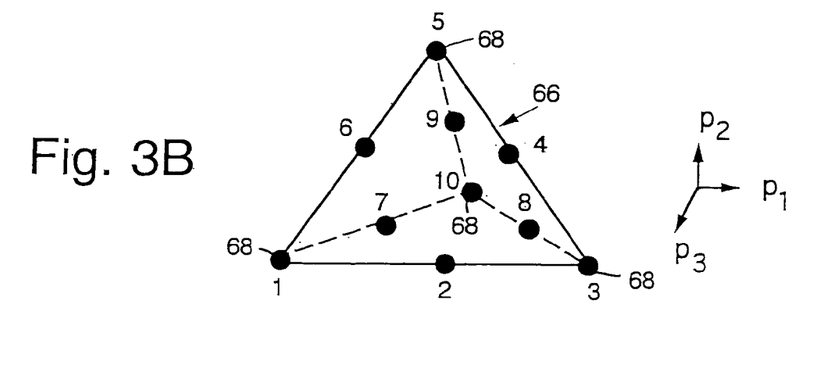

The variation of the pressure with the remaining s variables is approximated using simple polynomials, such as linear, quadratic and/or cubic. For a linear variation, the points at which the data are determined are located at the vertices of an s-dimensional simplex and are at unit distance from the origin. In this case there are s+1 vertices and s+1 unknown coefficients to be determined. For a quadratic variation, in addition to the vertices of the simplex, the midpoints of all the edges are included as well. This results in (s+1)(s+2)/2 nodes and as many unknown polynomial coefficients that must be determined. FIG. 3 shows the points at which these data are required in two dimensions 64 (s=2) and three dimensions 66 (s=3) for a quadratic fit. For a cubic variation, additional values can be specified at four equally spaced locations (including two vertices) on a line joinng any two simplex vertices, and the number of nodes becomes (s+1)(s+2)(s+3)/6.

In the two-dimensional situation 64 shown in FIG. 3 the pressure $\phi$ can be approximated as:

$$\phi = a_1 + a_2 x + a_3 y + a_4 x^2 + a_5 xy + a_6 y^2. \quad (2)$$

Given pressure values $\phi_1, \phi_2, \ldots, \phi_6$, specified at the vertices 68 of the simplex, the coefficients $a_1, a_2, \ldots, a_6$ can be obtained from the following system of equations:

$$\begin{vmatrix} 1 & x_1 & y_1 & x_1^2 & x_1 y_1 & y_1^2 \\ 1 & x_2 & y_2 & x_2^2 & x_2 y_2 & y_2^2 \\ \cdots & \cdots & \cdots & \cdots & \cdots & \cdots \\ 1 & x_6 & y_6 & x_6^2 & x_6 y_6 & y_6^2 \end{vmatrix} \begin{vmatrix} a_1 \\ a_2 \\ \cdots \\ a_6 \end{vmatrix} = \begin{vmatrix} \phi_1, \\ \phi_2, \\ \cdots \\ \phi_6, \end{vmatrix} \quad (3)$$

The generalization to higher-dimensional simplexes and higher-order polynomials is developed as described in the preceding, wherein at least a minimum number of pressure values is required depending on the number of dimensions and the order of the polynomial used. However, the number of pressure values that is typically used is greater than this minimum (greater than six values in the preceding example). This helps reduce the effect of noise in the data on the accuracy with which the response surface models the functional relationship between a variable (e.g., aerodynamic pressure) and the geometric parameters. The coefficients in this case may estimated using a least squares or least $\rho$th power approach ($\rho > 0$).

The method of combining neural networks and traditional polynomial fitting techniques of an embodiment of practicing the present invention is as follows, where, by way of example and not of limitation, the polynomial is assumed to be linear.

First, separate the h geometric parameters into two categories, where the variation of a first group of parameters $f_i$ ($i = 1, 2, \ldots, s$) results in fairly "simple" variations in the pressure that can be represented by low-order polynomials (order $\leq M_s$, where $M_s$ is a selected small positive integer, such as 1, 2 or 3). The variation of a second group of the remaining parameters $g_j$ ($j = 1, 2, \ldots, c$) corresponds to "complex" variations in the data ($h = s + c$).

Multidimensional polynomials are used to represent the variation of aerodynamic data with respect to the simple parameters $f_i$, and neural networks are used to represent the variation of the data with respect to the complex parameters $g_j$.

Second, construct a simplex in s-dimensional space ($s+1$ vertices) and obtain simulation data $D_k$ ($k = 1, 2, \ldots s+1$) at each of the vertices of the simplex by varying the parameters $g_j$. Assign one neural network $N_k$ for each vertex of the simplex and train each neural network $N_k$ with the simulation data $D_k$ generated for the corresponding vertex number k. The input for each network includes the bias value, the axial location along the airfoil and the complex geometric parameters $g_j$. Let $R_k(g_j)$ represent the trained output of the neural network, and let $\phi$ denote the variation of the physical variable of interest (e.g., pressure) with the $g_j$ complex parameters at the k th vertex of the simplex.

The surface pressure distribution corresponding to a set of geometric parameter values is obtained through the following two-step process.

First, obtain the pressure at each of the vertices of the simplex using the corresponding neural networks. This is easily done since the values assigned to the "complex" geometric parameters are known; and Second, compute the estimates of the coefficients of a low order (e.g., linear) polynomial, and use the prescribed values of the simple geometric parameters to obtain an estimate for the required pressure distribution. This is done by defining shape functions $P_k(f_i)$ ($k = 1, 2, \ldots, s+1$) according to $$P_k = a_0^k + \sum_{i=1}^{s} a_i^k f_i, \quad (4)$$

where the coefficients $a_i^k$ ($k = 1, 2, \ldots, s+1$) are determined from the conditions:

$$P_k = 1 \text{ at vertex k}, \quad (5A)$$

$$P_k = 0 \text{ at vertex k*(k* $\neq$ k)}. \quad (5B)$$

The shape functions $P_k$ are required to satisfy the condition $$\sum_{k=1}^{s+1} P_k(f_i) = 1 \text{ (for all } f_i \text{ in or on the simplex).} \quad (6)$$

The trained neural networks, together with the low order polynomial fit, define a composite response surface (CRS), which can be expressed as:

$$CRS\{f_i g_j\} = \quad (7)$$
$$\sum_{k=1}^{s+1} P_k(f_1, \ldots, f_s) R_k(g_1, \ldots, g_c) \quad (i = 1, \ldots, s; j = 1, \ldots, c)$$

The preceding discussion provides a general formula and is not restricted to linear polynomials. The shape functions $P_k$ can be any higher-order polynomial. However, use of a higher order polynomial will require specification of shape functions at more than $s+1$ nodes.

The accuracy with which this composite response surface represents the actual functional dependence of the aerodynamic quantities on the design or modeling parameters is determined by the accuracy of the original aerodynamic data, by the number of simulations used to populate the design space, by the neural network parameters, such as the number of neurons in the hidden layers 52 and 60 of FIG. 2, and by the orders of the polynomials used. The accuracy with which the neural networks represent the training data is estimated by a training error, TE, that is minimized to obtain the network weights. For example, the training error may be a weighted sum of squares (or $\rho$th powers) of differences, $$TE\{g_j\} = \sum_{n=1}^{n_{max}} \sum_{i=1}^{i_{max}} W_{i,n} |\Phi_i^n - \phi_i^n|^2, \quad (8)$$

where $\Phi_i^n$ is a target pressure at a location n, $\phi_i^n$ is a corresponding output pressure from the network, $i_{max}$ is the total number of data points on the surface of the airfoil at which the target pressures are prescribed, and $n_{max}$ is the number of simulations used to train this particular network. Optionally, the number of neurons is increased successively until the training error is sufficiently small (e.g., no greater than a selected threshold number $\epsilon$).

The accuracy with which the composite response surface represents the objective function in design space can be estimated by comparing the pressure distributions of the computed validation data sets (which are different from the training set) to the pressure distributions obtained using the composite response surface for these validation cases. This validation process is essential in establishing the adequacy of the generalization capabilities of the response surface. Typically, this is carried out at or adjacent to the centroid of the simplex.

Process For Aerodynamic Design Optimization Using Composite Response Surfaces

Figure 4:
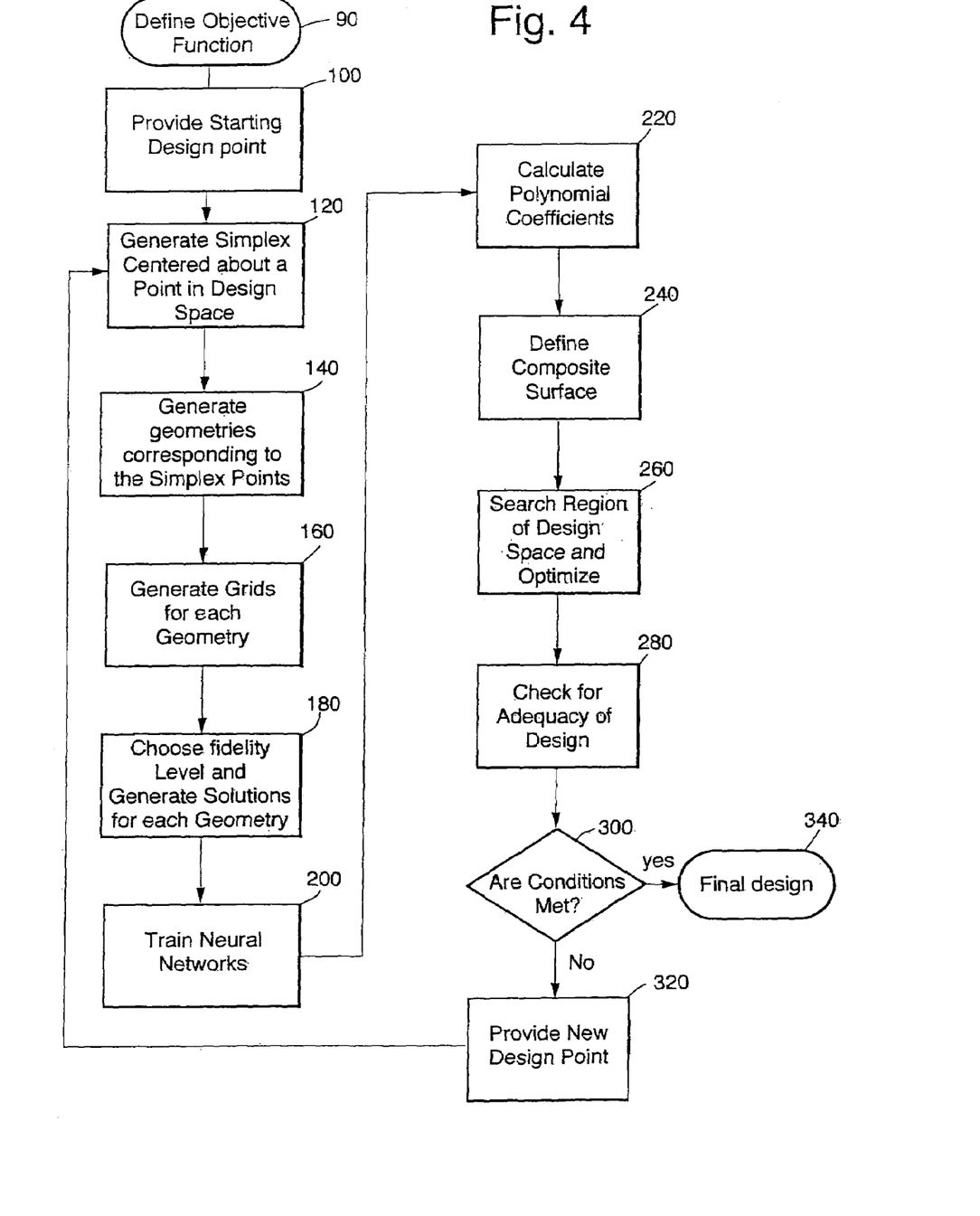
FIG. 4 shows a flowchart of a process for optimizing a design using both neural networks and polynomials to construct a composite response surface in accordance with one preferred embodiment of the present invention.

FIG. 4 illustrates steps for implementing a method according to the present invention. An objective function in step 90 is obtained from the design requirements. In step 100, an initial geometry or design point is specified. Ideally, this initial geometry should be as close as possible to the optimum. In aerodynamic design, several approaches, such as inverse design procedures, meanline analyses, and streamline curvature-based methods, can be used to obtain this initial geometry. This initial geometry serves as the centroid of the first simplex. In step 120, the design space is populated in the vicinity of the initial geometry by constructing a simplex in design space around this centroid. The geometry corresponding to each of the vertices (for a linear variation) and interior nodes (for quadratic, cubic or higher order polynomials) is obtained in step 140. The process then generates grids for each geometry in step 160. At this stage in the process, step 180, a fidelity level (e.g., maximum inaccuracy) is chosen and solutions are generated for each geometry. In steps 200 and 220, the neural networks are trained and the polynomial coefficients that define variation of a target quantity (e.g., pressure) within the simplex are computed. The input nodes of the neural nets will typically contain parameters that correspond to the physical location on an aerodynamic component and those geometric parameters that give rise to "complex" behavior of the objective function. At this point, step 240, the composite response surface is defined.

The process continues to step 260, where a search of the region of the design space represented by the composite response surface is performed. Various methods can be used to accomplish this constrained search. Geometrical and other constraints and rules-of-thumb that designers or modelers have developed can be incorporated within this search procedure (for example, using a penalty function method). In addition, constraints that limit the search procedure to the volume of the simplex are also incorporated in the search. In step 280, the system determines whether the local optimum obtained in the previous step lies on or outside the boundaries of the simplex. If the design conditions have not been met in step 300 so that the search procedure terminates at a point on or outside the boundaries of the simplex, this point is chosen as a centroid of a new simplex, in step 320, and the process is repeated until the search terminates inside the simplex. However, the process can be stopped at any time when the design or model is deemed adequate, as shown in step 340.

Additionally, several types of design refinements may be necessary. A particular design may require many iterations before an optimal solution is obtained. One reason for this could be that the initial design is very different from the target design. The need to minimize overall costs dictates that one obtain a preliminary design or model based on low-fidelity, low-cost simulations (e.g., potential flow solutions). The process shown in FIG. 4 is repeated using higher fidelity simulations (e.g., Euler or Navier-Stokes solutions). A second level of refinement may involve repeating the process shown in FIG. 4 with a simplex of reduced size. Finally, the geometry corresponding to the optimal design is used to verify that the design performs as required by the design specifications.

An optimal solution obtained by the preceding procedure is a point in design space that meets all the initial design requirements and constraints. However, after obtaining this optimal solution, the user often wishes to modify the target or the constraints to arrive at a better and improved design, or to analyze a variety of what-if scenarios. Several hundred such trade-off studies may be required before the final solution is defined. These analyses can be performed very efficiently by representing the functional dependence of the aerodynamic quantities in the vicinity of the design obtained in the process steps shown in FIG. 4, using the composite response surface approximation and once again searching this space with the new target designs and constraints embedded in the search procedure. Clearly, this process can only be used if the new targets are contained in the region of design space where the generalization capabilities of the response surface are adequate. It has been shown, using aerodynamic design as an example, that the search procedure requires two to three orders of magnitude less computing time than is required for simulation and training the network. This allows the designer to rapidly perform a variety of trade-off studies that would naturally involve changing the constraints to resolve design conflicts or improve the design.

Figure 5A:
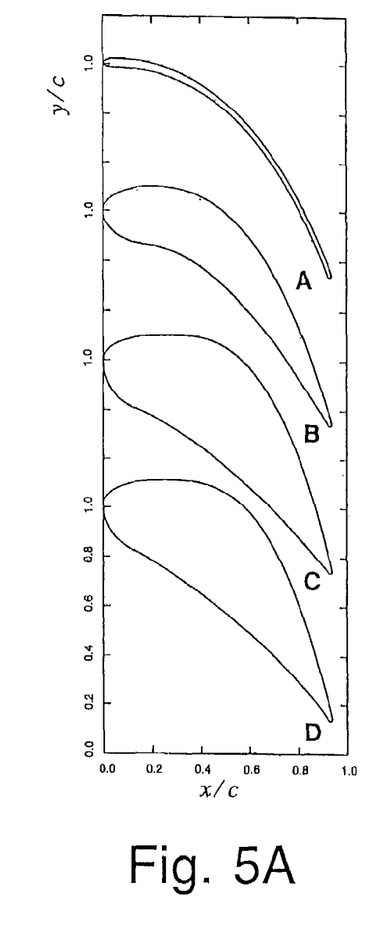
FIG. 5 is a graphical presentation showing the progression of design optimization for an airfoil in accordance with one preferred embodiment of the present invention.
Figure 5B:
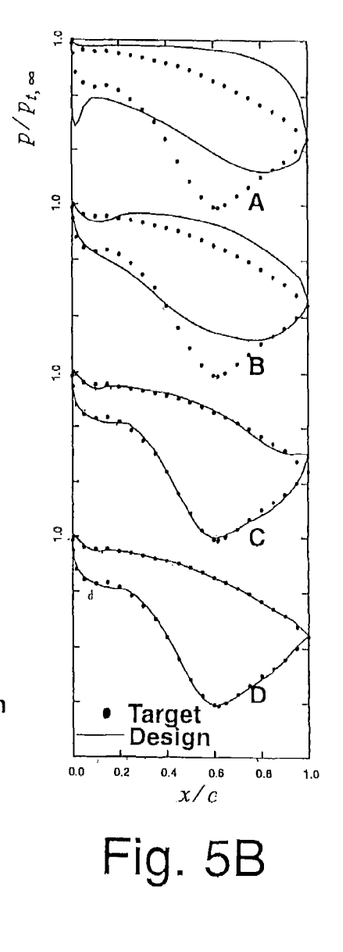

Design in a Steady Flow Environment: Metamorphosis of a Generic Shape into an Optimal Airfoil The present invention was used to reconstruct the shape of a turbine airfoil, given a desired pressure distribution and some relevant flow and geometry parameters. The shape of the airfoil was not known a priori. Instead, the shape was evolved from a simple curved section of nearly uniform thickness. The evolved optimal airfoil shape closely matched the shape of the original airfoil that was used to obtain the pressure distribution. This illustrates a "blind" test. FIG. 5 illustrates the evolution of a design according to a blind test. The evolution of the shape of the airfoil is shown on the left, while the corresponding pressure distributions compared to the target pressure distribution are shown on the right. Clearly, the surface pressures approach the target pressure as the design progresses. The optimal airfoil shown at the bottom has a pressure distribution that is very close to the target pressure distribution.

Design in an Unsteady Flow Environment

Aerodynamic design efforts typically deal with steady flows. However, there are many instances where unsteady effects can have a significant impact on the overall performance of the component. A design methodology according to the invention provides a natural framework for including unsteady effects in the design process, because of the general manner in which the objective function can be defined.

As an illustration, the invention can be used in a specific unsteady aerodynamic design problem, namely, transonic high pressure (HP) aircraft engine turbine design. The flow in HP turbines is complicated by the presence of shocks, wakes, tip leakage, and other secondary flow effects. These shocks, wakes, and vortical flows are ingested by downstream stages, resulting in complex interactions with one another and with the flow in these stages. All of these effects are complicated further by the inherent unsteadiness of the flow field that results from the relative motion of the rotor and stator rows and gives rise to unsteady interactions both within the HP turbine stages and between the HP turbine and the adjacent low pressure (LP) turbine stages. These unsteady effects result in poor aerodynamic performance, unsteady blade stresses, fatigue, vibration and reduced blade life.

The present design method can be used to improve the unsteady aerodynamic performance of transonic turbines by optimizing the shape of the stator and rotor airfoils. This is accomplished by formulating an objective function that minimizes the unsteady amplitudes on the stator vane (or rotor blade), subject to a constraint that the tangential force on the rotor airfoil (i.e., turbine work output) does not decrease. The pressure amplitude is used as a measure of the unsteadiness in the flow field and is defined as the range of temporal pressure variation on the airfoil surface.

Where unsteady shocks are present in a turbine, the design process can be used to weaken, or eliminate, the shocks. The presence of unsteady shocks results in large unsteady pressure amplitudes. Thus, the pressure amplitudes are directly related to the shock strength. Hence, a reduction in the unsteady amplitudes on the airfoils can have an additional benefit of weakening or eliminating the shocks in the flow field. This example also illustrates the use of high-fidelity simulations, such as unsteady Navier-Stokes computations, to include all the relevant physics of the problem and to steer the optimization within the framework of the invention.

Figure 6A:
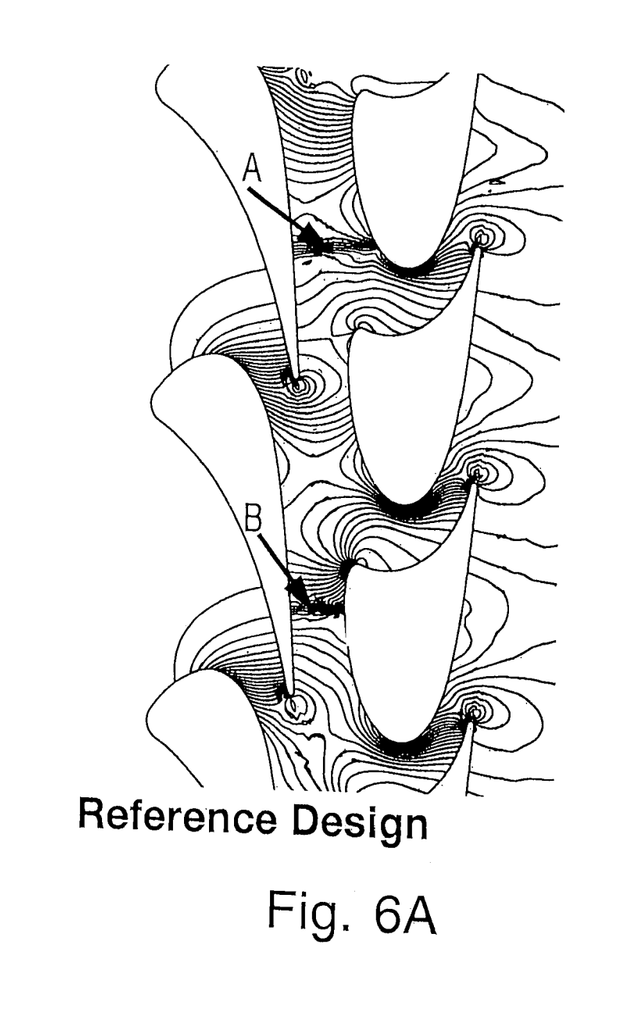
FIG. 6 shows a graph comparing the instantaneous pressure contours in the reference and optimized designs of a gas generator turbine.
Figure 6B:
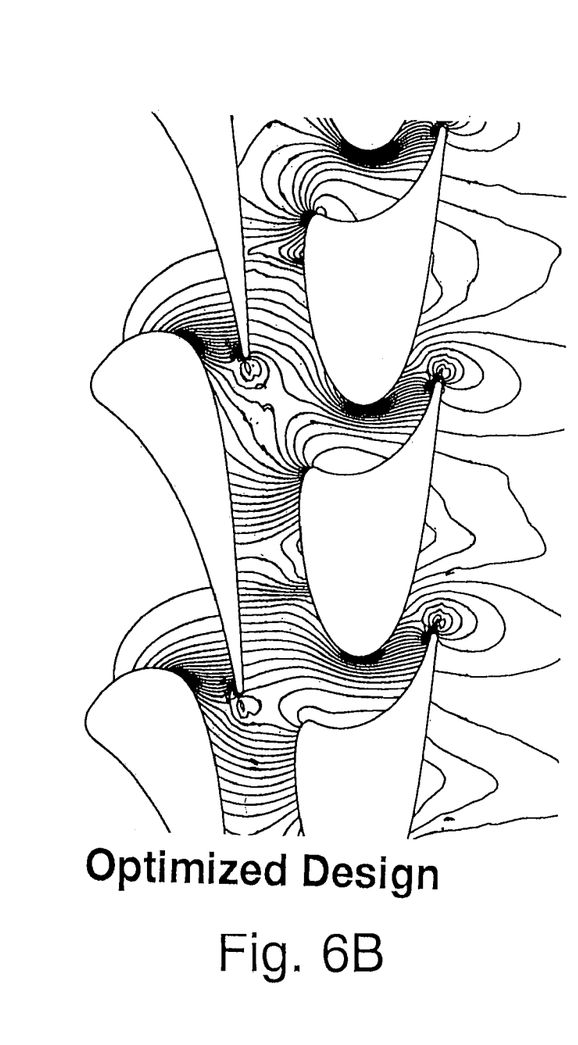

A first example deals with the application of this method to the redesign of the first stage of a gas generator turbine with the goal of improving its unsteady aerodynamic performance. The turbine is a two-stage configuration with an aggressive design characterized by high turning angles and high specific work per stage. Although the turbine was designed to operate in the high-subsonic regime, an unsteady analysis showed very strong interaction effects, including an unsteady moving shock in the axial gap region between the stator and rotor rows. It is hypothesized that the strength of this shock can be reduced by optimizing the airfoil geometries, and the overall unsteady aerodynamic performance of the turbine can thereby be improved. Since the shock can only be discerned by an unsteady aerodynamic analysis, a time-accurate Navier-Stokes solver is coupled to the neural net-based optimizer and provides simulation inputs to it. FIG. 6 compares the instantaneous pressures in the reference and optimized designs of a gas generator turbine. Clearly, the shocks, represented by curves A and B on FIG. 6, present in the reference design (which appear as clustered contours in the region between the stator and rotor rows) have been eliminated in the optimized design. The invention yields a modified design that is close to the reference design and achieves the same work output, yet has better unsteady aerodynamic performance because the flow through the turbine is shock-free.

A second example deals with the application of the invention to the redesign of a transonic turbine stage. The design goal is to improve its unsteady aerodynamic performance by weakening the shocks in the stage and thus reducing their effect on turbine aerodynamics. The tangential force on the rotor is constrained so that it does not decrease during the optimization process.

Figure 7A:
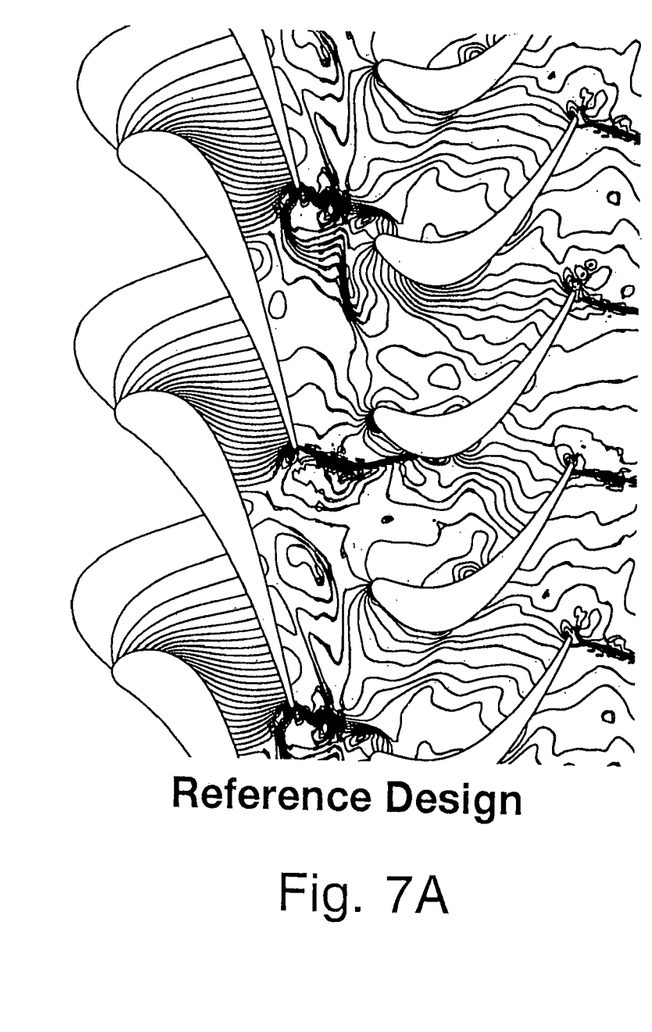
FIG. 7 shows a graph comparing the instantaneous pressure contours in the reference and optimized designs of a transonic turbine.
Figure 7B:
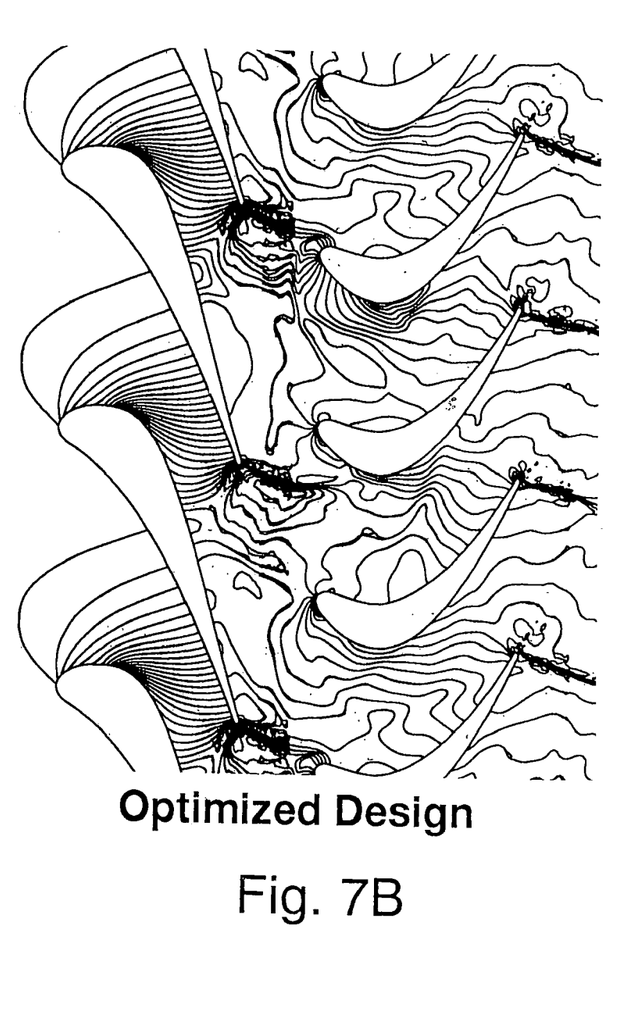

The application of this design method yielded a new design with a slightly different geometry. FIG. 7 compares the instantaneous pressure contours in the reference design and optimized design for a transonic HP turbine and shows that the unsteady stator trailing edge shock in the reference design has been weakened in the optimized design. This leads to lower unsteady pressure amplitudes on the airfoil surfaces and improves the aerodynamic performance. These reductions in unsteady pressure amplitudes were obtained without changing the tangential force on the stator and rotor airfoils or the work output of the turbine. The uncooled stage efficiency for the optimized design was nearly identical to that for the reference design.

Figure 8A:
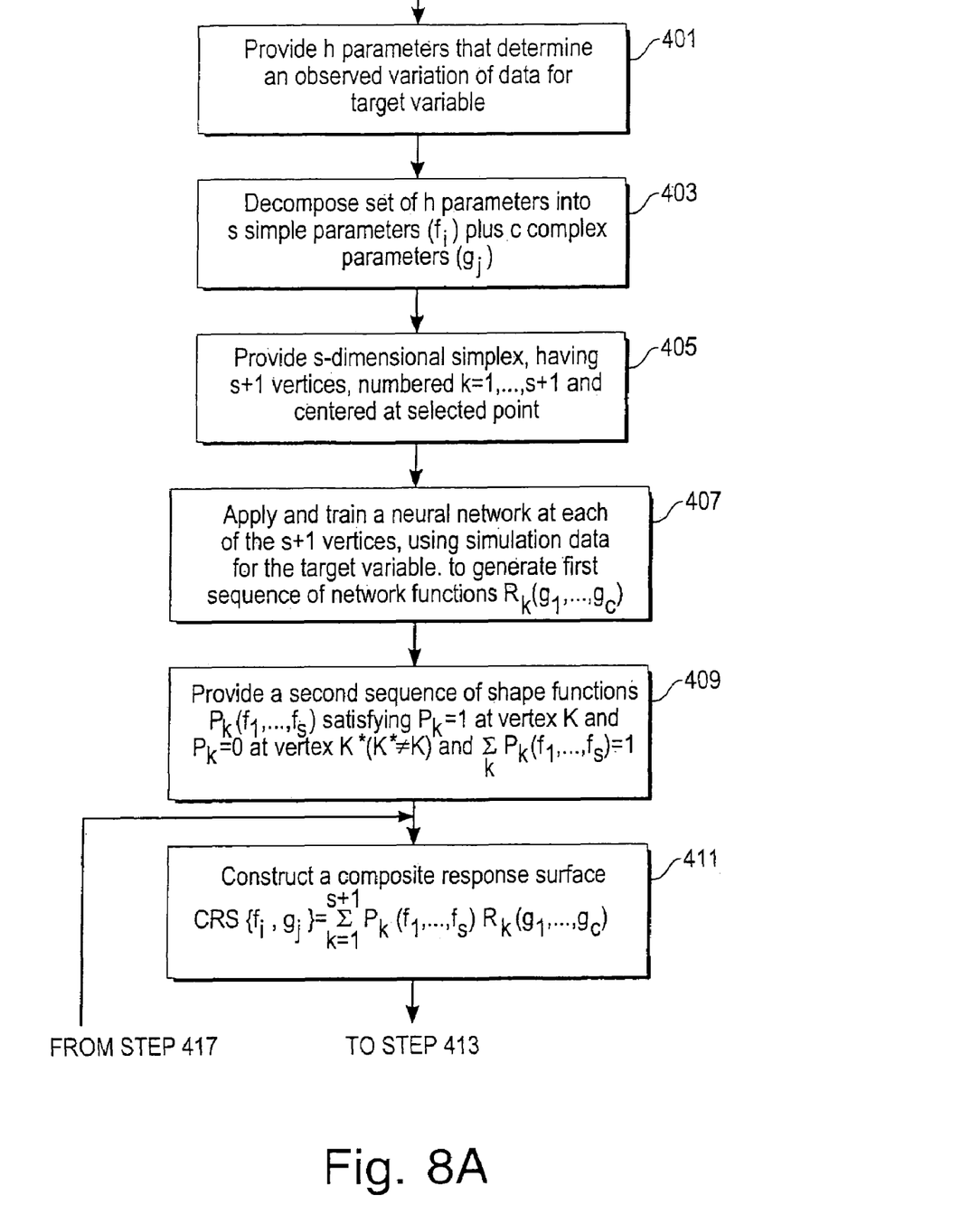
FIGS. 8A/8B is a flow chart of a general process for practicing the invention.
Figure 8B:
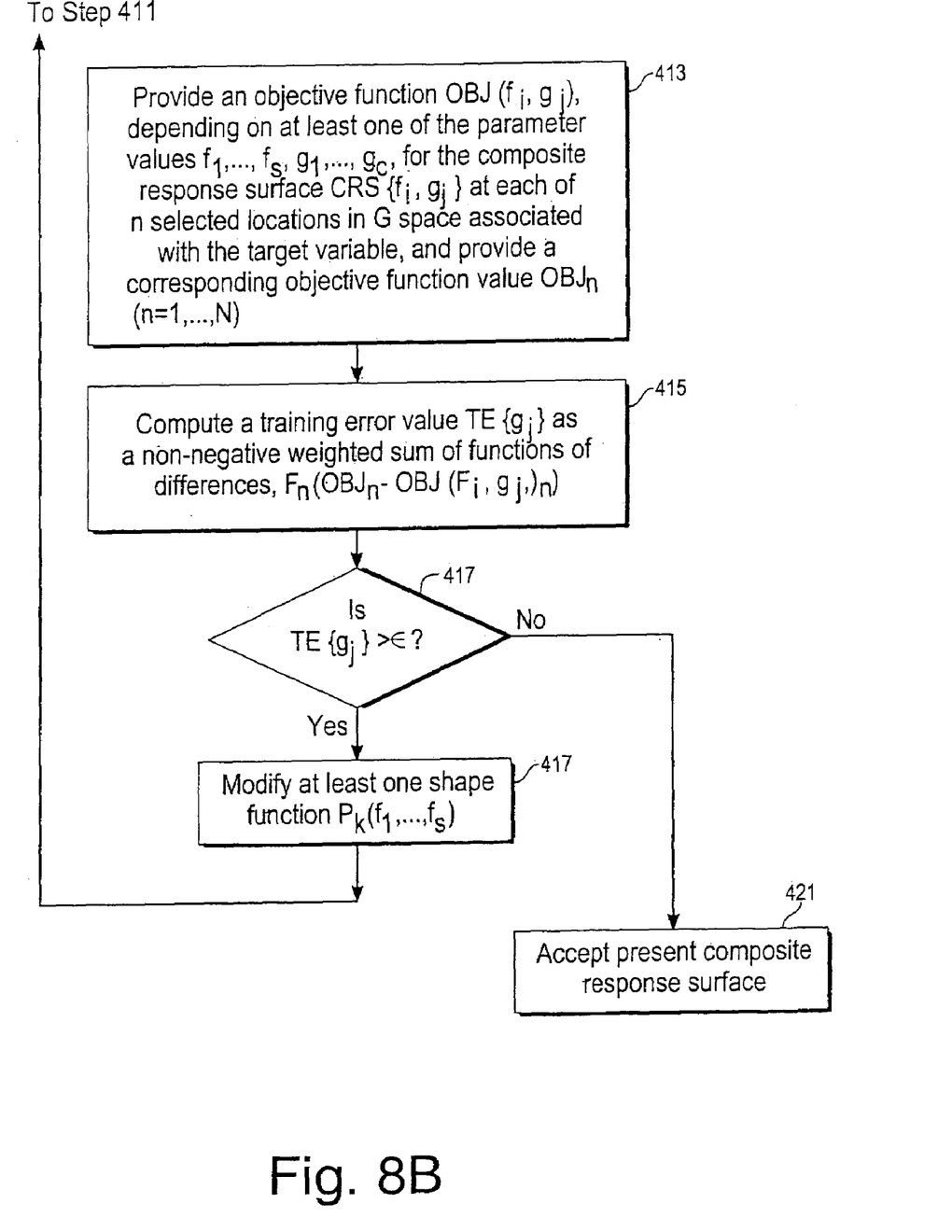

FIGS. 8A/8B illustrate a general procedure for practicing the invention. In step 401, a set of h parameters (or variables) is provided that together determine an observed variation of data for a target variable, where each parameter corresponds to a coordinate in an h-dimensional parameter space G. In step 403, the h parameters are decomposed into a first set of s simple parameters $f_i$, numbered i=1, ..., s, and a second set of complex parameters $g_j$, numbered j=1 ..., c (as characterized in the preceding discussion), where s+c=h and the c parameters may be used to describe the provided data using neural networks. In step 405, an s-dimensional simplex having s+1 vertices, numbered k=1, ..., s+1, and centered at a selected point in the space G, is provided. In step 407, a neural network is applied and trained for each of the s+1 vertices, using selected simulation data for the target variable, to generate a first sequence of network functions $R_k(g_1, ..., g_c)$. In step 409, a second sequence of shape functions $P_k(f_1, ..., f_s)$ is provided that satisfy the conditions $P_k(f_1, ..., f_s)=1$ a vertex number k, $P_k(f_1, ..., f_s)=0$ at any other vertex k*($\neq$k) of the simplex, and the sum of the shape functions $P_k(f_1, ..., f_s)$ is identically 1 for all coordinate points $(f_1, ..., f_s)$ in step 411, a composite response surface $$CRS\{f_i,g_j\} = \sum_{k=1}^{s+1} P_k(f_1, ..., f_s) \cdot R_k(g_1, ..., g_c). \quad (9)$$

is formed.

Optionally, this model can be made more accurate using the steps 413–421. In step 413, an objective function value $OBJ_n$, dependent upon at least one of the parameter values $f_1, ..., f_s, g_1, ..., g_c$, is provided in G space, for the composite response surface $CRS\{f_i,g_j\}$ at each of n selected locations associated with a target variable solution, where n is a selected positive integer. In step 415, a training error $TE\{g_j\}$ is computed as a non-negative weighted sum of functions of differences $F_n(OBJ_n-OBJ(f_i,g_j))$, where each function $F_n$ is monotonically increasing in a magnitude of its function argument and has a value of 0 where the function argument is 0. The training error $TE\{g_j\}$ may, for example, be determined as in Eq. (8).

In step 417, the system determines if the training error $TE\{g_j\}$ is greater than a selected positive threshold number e. When the answer to the query in step 417 is "yes" (TE$\geq$e), the system provides at least one modified shape function (e.g., a quadratic or cubic polynomial, in place of a linear polynomial, or a polynomial with at least one modified coefficient), in step 419, returns to step 411, and repeats step 411 to obtain a modified design. When the answer to the query in step 417 is "no" (TE$\leq$e), the system accepts the present composite response surface, in step 421.

It is important to note that, although the invention has been described in the context of providing a composite response surface to optimize a design, those skilled in the art will appreciate that the mechanisms of the invention are capable of being distributed as a program product in a variety of forms to any type of information handling system. The invention applies equally regardless of the particular type of signal bearing media utilized to actually carry out the distribution. Examples of signal bearing media include, without limitation, recordable type media such as floppy disk or CD ROMs and transmission type media such as analog or digital communications links.

The preceding application of the method to improving the unsteady performance of aerodynamic components is only an example of how this invention can be applied and should not be construed as the only application of the invention. The invention is capable of other and different embodiments, and its several details are capable of modifications in various obvious respects, all without departing from the invention.

What is claimed is:

1. A method for constructing a composite response surface based on neural networks and selected functions, the method comprising providing a computer that is programmed:
   (1) to provide a set of h initial parameters that determine variation of provided data for a target variable, where each parameter corresponds to a coordinate in an h-dimensional parameter space G;
   (2) to decompose the h parameters into a first set of s simple parameters $f_i$, numbered i=1, . . . , s, that may be used to describe the provided data with polynomials of total degree no greater than a selected number $M_s$, and a second set of c complex parameters $g_j$, numbered j=1, . . . , c, that may be used to describe the provided data using neural networks, and with s+c=h, where s, c and $M_s$ are selected positive integers;
   (3) to provide a simplex, having s+1 vertices, numbered k=1, . . . , s+1, and centered at a selected point in the space G;
   (4) to apply a neural network for each of the s+1 vertices, and to train each of the s+1 neural networks, using selected simulation data obtained by varying the parameters $g_j$ to generate a first sequence of network functions $R_k(g_1, \ldots, g_c)$;
   (5) to provide a second sequence of shape functions $P_k(f_1, \ldots, f_s)$ that satisfy the conditions $P_k(f_1, \ldots, f_s)=1$ at the vertex numbered k and $P_k(f_1, \ldots, f_s)=0$ at any vertex other than vertex number k, and $\Sigma P_k(f_1, \ldots, f_s)=1$ for all values of $f_1, \ldots, f_s$; and
   (6) to form a composite function $CRS(f_i, g_j)$ defined by $$CRS\{f_i, g_j\} = \sum_{k=1}^{s+1} P_k(f_1, \ldots, f_s) \cdot R_k(g_1, \ldots, g_c).$$

2. The method of claim 1, wherein said computer is further programmed to select said set of complex parameters to include at least one polynomial in said complex parameters $g_j$ having a selected degree $M_c$ satisfying $M_c > M_s$.

3. The method of claim 1, wherein said computer is further programmed to choose said integer $M_s$ from the group of integers consisting of 1, 2 and 3.

4. The method of claim 1, wherein said computer is further programmed to select said set of complex parameters to include any of said h parameters that does not qualify as a simple parameter.

5. The method of claim 1, wherein said computer is further programmed:
   (7) to provide an objective function $OBJ(f_k, g_j)_n$, dependent upon at least one of the parameter values $f_1, \ldots, f_s, g_1, \ldots, g_c$, for the composite function $CRS\{f_k, g_j\}$ at each of N selected locations in G space, numbered n=1, . . . , N, associated with the target variable, and to provide a corresponding objective function value $OBJ_n$ for the target variable at each of the N selected locations, where n is a selected positive integer;
   (8) to compute a training error value $TE\{g_j\}$ as a non-negative weighted sum of functions of differences $F_n(OBJ_n - OBJ(f_k, g_j)_n)$, where each function $F_n$ is monotonically increasing in a magnitude of the function argument and has a value 0 where the function argument is 0;
   (9) when the training error value $TE\{g_j\}$ is greater than a selected threshold error value $\epsilon$, to provide at least one of a modified set of shape functions $P_k(f_1, \ldots, f_s)$, and returning to step (6); and
   (10) when the training error $TE\{g_j\}$ is no greater than the threshold error value $\epsilon$, to accept the present composite response surface.

6. The method of claim 1, wherein said computer is further programmed to apply said composite response surface to optimization of a design of a physical object.

7. The method of claim 6, wherein said computer is further programmed to choose said physical object to be a shape for an aircraft component.

8. The method of claim 1, wherein said computer is further programmed to apply said composite response surface to modeling of a response to a process.

9. The method of claim 1, wherein said computer is further programmed to apply said composite response surface to modeling response of a physical object.

* * * * *